Figure 1:
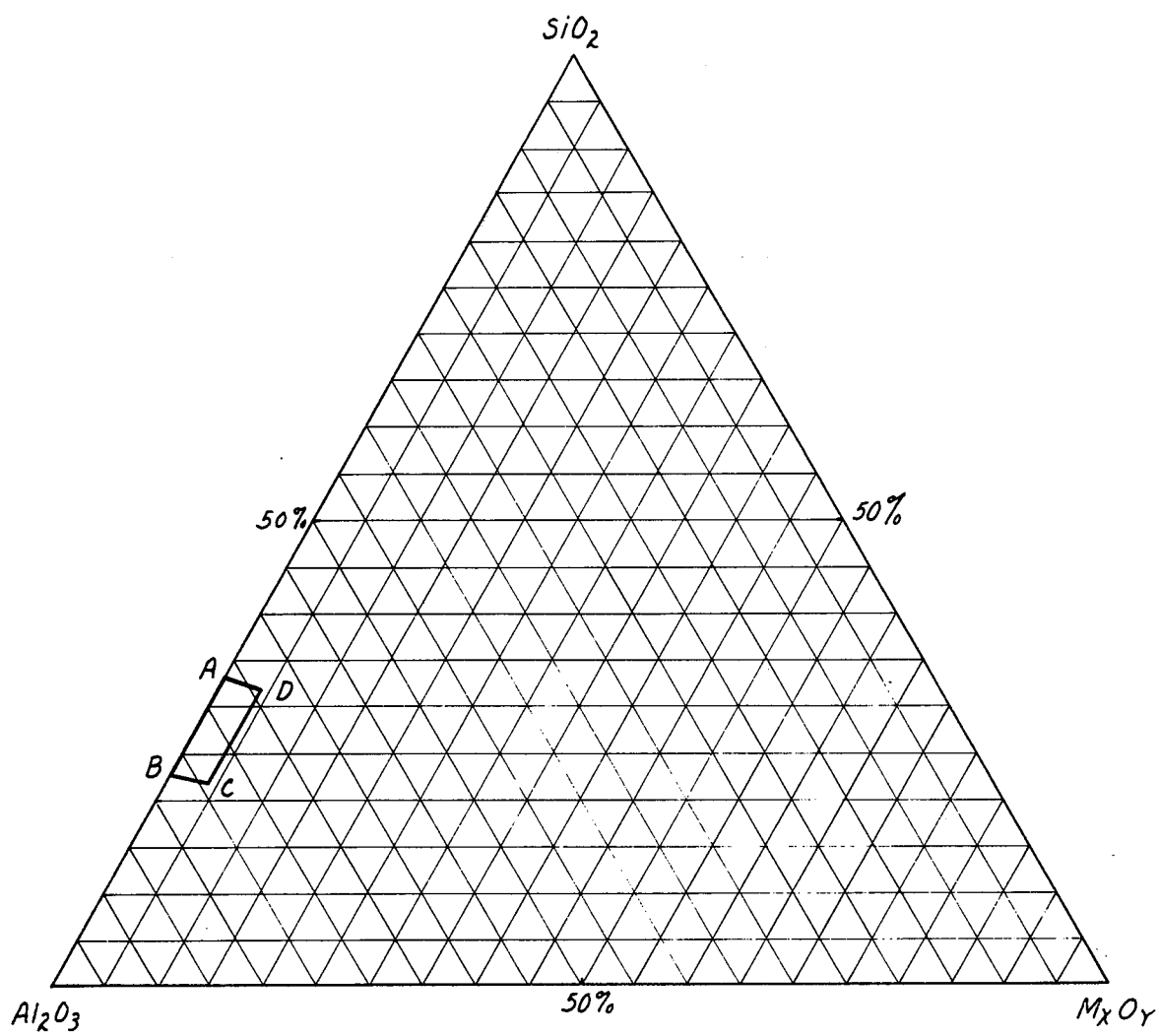

United States Patent [19]

Karst et al.

[11] 4,047,965

[45] Sept. 13, 1977

[54] NON-FRANGIBLE ALUMINA-SILICA FIBERS

[75] Inventors: Karl A. Karst, St. Paul; Harold G. Sowman, Maplewood, both of Minn.

[73] Assignee: Minnesota Mining and Manufacturing Company, St. Paul, Minn.

[21] Appl. No.: 683,183

[22] Filed: May 4, 1976

[51] Int. Cl.² .............................................. C04B 35/80
[52] U.S. Cl. ..................................... 106/65; 106/73.4; 106/73.5
[58] Field of Search ........................ 106/65, 73.4, 73.5

[56] References Cited

U.S. PATENT DOCUMENTS

| 3,503,765 | 3/1970 | Blaze | 106/65 |
| 3,585,153 | 6/1971 | Kiehl et al. | 106/66 |
| 3,795,524 | 3/1974 | Sowman | 106/65 |
| 3,853,688 | 12/1974 | D'Ambrosio | 106/65 |
| 3,865,599 | 2/1975 | Mansmann et al. | 106/73 H |
| 3,947,534 | 3/1976 | Mansmann | 106/65 |
| 3,950,478 | 4/1976 | Kenworthy et al. | 106/65 |

Primary Examiner—J. Poer
Attorney, Agent, or Firm—Cruzan Alexander; Donald M. Sell; William G. Ewert

[57] ABSTRACT

Transparent, smooth, fracture resistant, discreet, refractory oxide fibers of homogeneous chemical composition comprising 96 to 100 weight percent of a mixture or chemical combination of 67 to 77 parts by weight alumina and 23 to 33 parts by weight silica, said fibers having a predominant polycrystalline phase of mullite, transitional alumina, or a mixture of both, said refractory fibers being made by fiberizing a viscous liquid of oxide precursors comprising a silica sol and a water dispersible alumina sol or water soluble or dispersible organic aluminum salt, and drying, collecting, and calcining the resulting green fibers.

23 Claims, 4 Drawing Figures

NON-FRANGIBLE ALUMINA-SILICA FIBERS

This invention relates to refractory fibers of alumina and silica, to a non-vitreous method for their production, and to articles made from or containing them, such as woven textiles and mats of such fibers or composites containing such fibers as reinforcement.

As background of the prior art, a number of patents and other literature have been published in the last decade or so disclosing synthetic, non-vitreous, refractory fibers made of various refractory inorganic oxides, and a number of products of this nature have been commercially announced or sold. For example, see U.S. Pat. Nos. 3,795,524 (Sowman) and 3,760,049 (Borer et al), which disclose (inter alia) transparent, continuous, refractory fibers comprising crystalline aluminum borosilicate made by extruding and drawing a viscous aqueous dispersion of basic aluminum acetate and colloidal silica and heating and firing the resulting "green" amorphous fibers to convert them into said refractory fibers.

U.S. Pat. No. 3,503,765 (Blaze) discloses polycrystalline alumina-silica fibers of 68–80% $Al_2O_3$, 14–30% $SiO_2$, and 1–10% of a modifying acid oxide selected from the group consisting of $B_2O_3$, $P_2O_5$ and $TiO_2$, the fibers having a predominant crystalline mullite phase. These fibers are prepared by a salt decomposition process (said to be similar to the process disclosed in U.S. Pat. No 3,322,865 (Blaze)) involving fiberizing a concentrated liquid made by dissolving aluminum metal in aqueous aluminum chloride to form a mother liquid to which colloidal silica, acid oxide (e.g., $H_3BO_3$), and a low surface tension liquid (e.g., acetic acid) are added. Apparently this salt decomposition process was specifically designed for making short or discontinuous fibers in bulk form. Further development of said polycrystalline alumina-silica fibers (and comparative alumina-silica fibers without modifying acid oxide), including attempts to translate the salt decomposition technology of said U.S. Pat. No. 3,322,865 into an extrusion-attenuation method of making continuous fibers, was carried out by Babcock and Wilcox Company ("B & W", the assignee of said U.S. Pat. No. 3,503,765) under contracts with the U.S. Government. Such contracts covered, inter alia, work which envolved a so-called "standard B & W fiber", having 77% $Al_2O_3$, 17% $SiO_2$, 4.5% $B_2O_3$, and 1.6% $P_2O_5$, made by a so-called "B & W salt decomposition process" from a fiberizable salt solution, the raw materials for which were aluminum metal, colloidal silica sol, a source of chloride (e.g., aluminum chloride), boric acid, phosphoric acid, and acetic acid.

Other prior art disclosing various alumina-silica fibers are U.S. Pat. No. 3,585,153 (Kiehl et al), No. 3,808,015 (Seufert et al), and No. 3,865,599 (Mansmann), British Pat. Specification 1,323,229 (Bayer Aktiengesellschaft), Belgium Pat. 803,116 (Imperial Chemical Industries Ltd.) and published U.S. application B 502,773 (Sowman).

The refractory, inorganic fibers of this invention have a homogeneous chemical composition comprising 96 to 100 weight percent, preferably at least 98 weight percent, and even more preferably 99 to 99.5 weight percent, of alumina and silica in admixture or in chemical combination in the ratio of 67 to 77, preferably 70 to 75, parts by weight alumina and 23 to 33, preferably 25 to 30, parts by weight silica. Said fibers can additionally contain up to 4 weight percent, preferably up to 2 weight percent, and more preferably 0.5 to 1 weight percent, of additive inorganic oxides of the formula $M_xO_y$, where M is a cation (other than Al or Si) and $x$ and $y$ are integers such that when $x$ is 1, $y$ is 1 or 2, and when $x$ is 2, $y$ is 1, 3 or 5. The additive inorganic oxides preferably have the formulas $M_2O_3$ or $M_2O_5$. Each said additive oxide is preferably a glass former (especially a low melting glass former, i.e., one melting below 700° C), such as $P_2O_5$ or $B_2O_3$, and is present in an amount no greater than 2 weight percent. (Said glass formers are sometimes called "network formers" in the art, e.g., see "Elements of Ceramics", by F. H. Norton, Addison-Wesley Press, Inc., Cambridge, Mass. (1952), page 149.) Said fibers can be made essentially free of additive metal oxides which are non-glass formers (sometimes called "net-work modifiers"), e.g., $Fe_2O_3$ and $Cr_2O_3$, or intermediate glass formers. However, such metal oxides can be present, in which case the amount of each is preferably less than 1 weight percent, though if the total amount of such metal oxides is 1 to 2 weight percent, then 0.5 to 2 weight percent of glass former, such as $P_2O_5$ or $B_2O_3$, should be present.

The refractory fibers of this invention have at least one polycrystalline (or microcrystalline) phase discernible by x-ray powder diffraction analysis. Where the crystallites (or microcrystals) are mullite ($3Al_2O_3 \cdot 2SiO_2$), they have a relatively large crystallite size, viz., an average size (or average major dimension) greater than 500 A and as large as 1000 A or larger. Where the crystallites are those of transitional alumina (viz., $\eta$, $\gamma$, or $\delta$), they have an average size less than 600 A. The fibers can have both polycrystalline mullite and polycrystalline transition alumina present (e.g., as a skin or sheath of the former surrounding a core of the latter). Where the fibers contain polycrystalline transition alumina (which always will be in admixture with amorphous silica), such fibers can be fired in air at 1200° C or 1400° C for a sufficient period, e.g., about 4 hours, or higher temperatures for shorter periods, e.g., 1500° C for 5 to 10 seconds, to form denser fibers having mullite as the sole or predominate polycrystalline phase, with the crystallites thereof being relatively large as described above. Such firing to convert crystallites to mullite is achieved without essentially any loss in the transparency of the fibers, and though such firing may result in some loss in strength and fracture resistance (especially if such firing is 1400° C for several hours), the values of these properties will still be significantly and desirably high.

Surprisingly, the refractory fibers of this invention are free of $\alpha$-alumina (discernible by X-ray powder diffraction analysis), particularly in view of the absence or relatively low amount of $B_2O_3$ or $P_2O_3$ in the fibers. Alos, the fibers can have mullite as the sole or predominant polycrystalline phase even in the absence of additives, e.g., $B_2O_3$.

The fibers of this invention are transparent to visible light and, if colorants are not added, the fibers look like glass fibers to the unaided eye or under an optical microscope (e.g., 50X). They are discreet in that they are not inseparately united, e.g., as by sintering, but can be physically separated from one another without breaking. Under an optical microscope (e.g., 50X) they appear uniformly round in cross section (that is, circular or oval), with a uniform diameter which can be up to 20 to 25 micrometers but which preferably is 7 to 15 micrometers, and they appear smooth (that is, they have an outer surface which has no discernible protuberances, roughness, holes or pits).

The fibers are flexible and strong, and they are durable or fracture resistant, i.e., they have a friability index (defined hereinafter) of at least 0.2. They can be readily handled without breaking and in their continuous yarn form can be woven into fabrics in a manner like commercial glass fibers. Surprisingly, these desirable properties can be achieved without the necessity of making the fibers with fine diameters, e.g., 3 to 5 micrometers or less. Also, they can be prepared relatively dense or non-porous with very low surface areas, i.e., less than 1 m²/g.

The refractory ceramic oxide fibers of this invention can be made by the manipulative steps disclosed in said U.S. Pat. No. 3,795,524, and preferably said U.S. Pat. No. 3,760,049; briefly these steps comprise fiberizing (i.e., forming fibers from) a viscous concentrate of oxide precursor materials, and drying, collecting and calcining or firing the "green" (or non-refractory) amorphous fibers to remove undesirable volatile and organic materials therefrom and convert the green fibers into said refractory fibers.

The fibers of this invention can be made in truly continuous form, which can be cut or subdivided to form staple fibers, and can be made essentially straight (that is, without curls or kinks). An array of the continuous fibers can be oriented in an ordered form, e.g., each fiber in the array being in essentially parallel alignment, as in the case of yarn, strands, tows, or rovings, or oriented in a random, intermeshed, interlocked or tangled form, as in the case of non-woven mat.

In the accompanying drawing, FIG. 1 represents a ternary composition diagram of the alumina, silica, and total additive inorganic oxide system, with the compositions of the fibers of this invention designated thereon, those compositions falling within the area or along the boundary defined by points A, B, C and D, the compositions at these points being as follows:

|   | $Al_2O_3$ | $SiO_2$ | $M_xO_y$ |
|---|---|---|---|
| A | 67 wt % | 33 wt % | 0 wt % |
| B | 77 | 23 | 0 |
| C | 74 | 22 | 4 |
| D | 64 | 32 | 4 |

Figure 2:
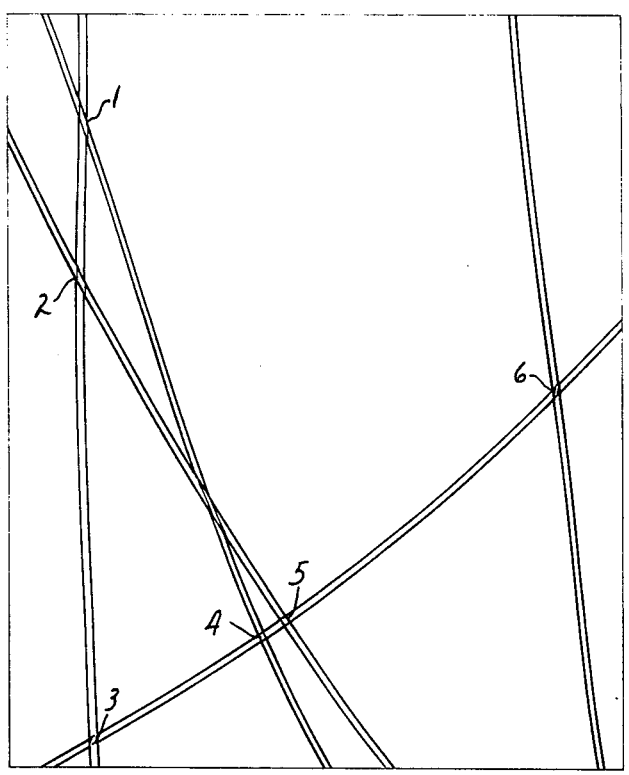
Figure 3:
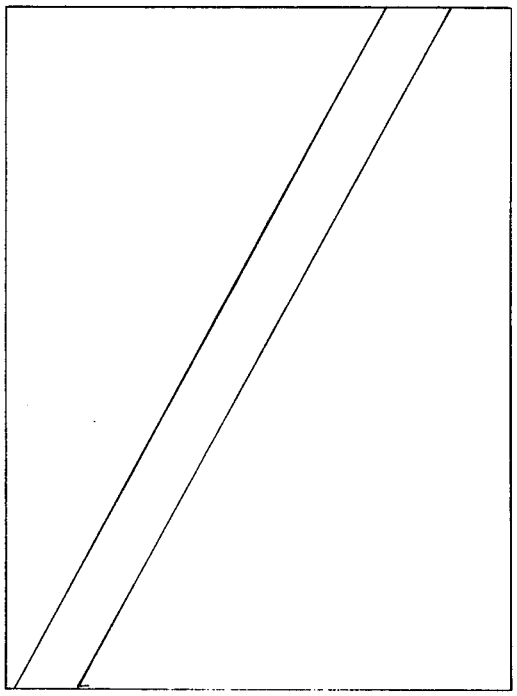
Figure 4:
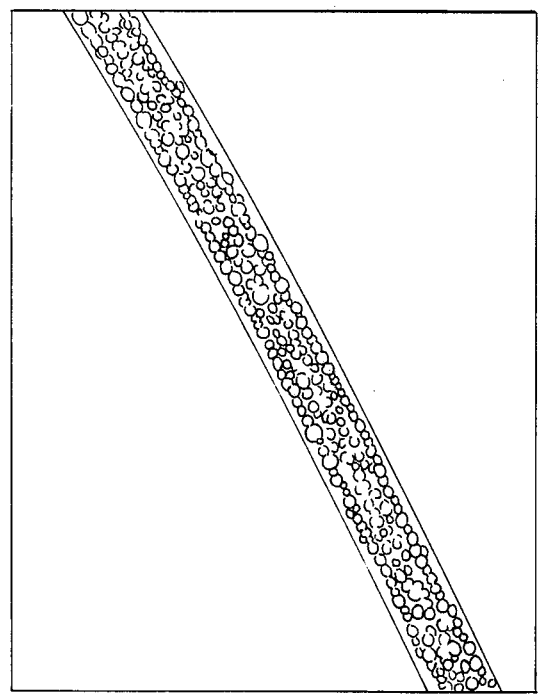

FIGS. 2–4 are pen-and-ink sketches of photomicrographs of refractory fibers, in which FIG. 2 represents transparent fibers of this invention consisting of $3Al_2O_3:2SiO_2$ prepared by firing green precursor fibers to 1000° C, FIG. 3 represents transparent fibers of this invention consisting of 98 wt % $3Al_2O_3:2SiO_2$ and 2 wt % $B_2O_3$ prepared by firing green precursor fibers to 1000° C and, for purposes of comparison, FIG. 4 represents fibers consisting of 98 wt % $3Al_2O_3:2SiO_2$ and 2 wt % $B_2O_3$ prepared by firing green precursor fibers to 1000° C derived from other material.

The starting material or fiber precursor composition from which the refractory fibers of this invention can be made comprises a liquid mixture of a silicon compound (which is preferably an aqueous dispersion of colloidal silica, or silica hydrosol) and a compatible aqueous solution or dispersion of a water-soluble or dispersible aluminum compound and, where used, other compatible compounds such as boron and phosphorous compounds. Said silicon, aluminum, boron, phosphorous and other compounds are those compounds which can be calcined to the respective oxides, i.e., silica, aluminum oxide, boron oxide, and phosphorous pentoxide.

Suitable aluminum compounds which can be used as alumina precursors representatively include water-dispersible alumina sols and water soluble aluminum salts such as aluminum formoacetate, $Al(OH)(OOCH)(OOCCH_3)$, aluminum nitrate, $Al(NO_3)_3.9H_2O$, aluminum isopropylate, $Al(OC_3H_7)_3$, basic aluminum acetate, $Al(OH)_2(OOCH_3).1/3\ H_3BO_3$, and mixtures thereof, the organic aluminum salts being preferred, particularly aluminum formoacetate (commercially available under the trademark "NIACET"). Aluminum chloride is not a useful alumina precursor for the fibers of this invention, especially in admixture with boric acid, for reasons given hereinafter. In fact, the fiberizable liquid from which the fracture resistant fibers of this invention are made should be essentially free of chloride, i.e., the chloride is less than about 1 weight percent, based on the total equivalent oxide weight. Thus, the green fibers are likewise essentially free of chloride and the refractory fibers made therefrom have at most a trace of chloride, the presence of significant amounts of chloride in the refractory fibers, e.g., 0.2 weight percent, having been found to be coincident with fragile fibers.

The precursor silica sol can be used with $SiO_2$ concentrations of 1 to 50 weight percent, and preferably 15 to 35 weight percent, sols of the latter concentrations being commercially available. The silica sol is preferably used as an aqueous dispersion or aquasol. The silica sol also can be used in the form of an organosol, the silica being colloidally dispersed in such water-miscible, polar organic solvents as ethylene glycol, dimethylformamide, and various glycol ethers sold under the trademark "CELLOSOLVE". The size of the colloidal silica particles in the aquasols or organosols can vary, e.g., from 1 to 100, preferably about 10 to 16, millimicrometers.

Where the refractory fibers of this invention are to contain boria, a suitable precursor therefor is boric acid, $H_3BO_3$. Basic aluminum acetate (i.e., boric acid stabilized aluminum acetate, commercially available under the trademark "NIAPROOF") can be used as a boria precursor, alone or in combination with boric acid.

Where the refractory fibers of this invention are to contain phosphorus pentoxide (with or without boria in addition), phosphorous pentoxide itself can be admixed with the alumina and silica precursors, though other phosphorous pentoxide precursors, such as ammonium hypophosphite, $NH_4H_2PO_2$, and phosphoric and hypophosphorous acids, which are compatible with the alumina and silica precursors, can be used.

The relative amounts of the alumina and silica precursors, and, where used, the additive oxide precursors, such as boria and phosphorous pentoxide precursors, in the starting material used to make the fibers should be such as to provide the above-described relative amounts of these oxides in the final refractory fibers in order to obtain the desired properties. For example, if the relative amounts of alumina and silica precursors are significantly greater than those described above, the resulting fibers will be frangible.

The preferred refractory fibers of this invention are those which do contain, in addition to alumina-silica, one or two glass formers because such fibers, with the desirable low surface area and fracture resistance, can be obtained using lower (and thus more economical) calcining temperatures, e.g., about 1000° C. In the absence of the glass formers, the desirably low surface area is obtained with calcining temperatures of about 1200° C.

The presence of glass former in the fibers may result in greater weight loss and shrinkage at high temperature, due to the volatility of the glass former and consequent densification. To prevent or minimize such weight loss or shrinkage when such fibers are used in a high temperature environment, e.g., as a belt in high temperature processing furnace, the fibers (or article made therefrom) can be pre-fired (and thus pre-shrunk) by firing at or in excess of the prospective use temperature. Said weight loss and shrinkage can also be prevented or minimized by having a lower amount of the precursor of the glass former (e.g., $B_2O_3$ or $P_2O_5$) in the fiberizable material, or by replacing a portion thereof with a precursor of an intermediate glass former or non-glass former (e.g., $Cr_2O_3$). Or a precursor of a glass former such as $B_2O_3$ can be replaced in whole or part with a precursor of a relatively less volatile glass former such as $P_2O_5$. Another reason for replacing $B_2O_3$ in whole or part with $P_2O_5$ is that in some applications of the fibers, the presence of $B_2O_3$ in the fibers may be objectionable; for example, where the fibers are used as thermal insulation in a neutron environment, such as a nuclear reactor, the presence of $B_2O_3$ will be objectionable because of its neutron absorbing cross-section, and thus $P_2O_5$ may be the preferred glass former to use.

The oxide precursor material and adjuvants, such as corn syrup, used in making the fiberizable material generally will contain small amounts of metal-containing impurities, and the resulting refractory fibers, therefore, will also normally contain small amounts of the oxide form of such impurities, for example, sodium normally will be present in the fibers, usually in an amount less than 0.1 weight percent.

The starting material used to prepare the refractory fibers of this invention can be prepared by admixing an aqueous silica sol with a compatible aqueous solution or dispersion of the aluminum compound and, where used, the other oxide precursors, such as the boron and phosphorous compounds, to obtain a uniform dispersion without formation of a gel. Generally, this dispersion will be clear though sometimes it may be hazy if the phosphorous pentoxide precursor used is ammonium hypophosphite or phosphoric acid. The pH of the dispersion will be inherently on the acid side, e.g., below 6, and is preferably 3 to 5. If desired, a compatible heat fugitive acid, such as acetic or nitric acid, can be added to the silica sol to acidify the same prior to use and prevent premature gelling. Compatible heat fugitive organic agents can be incorporated as adjuvants in the fiber starting material to improve shelf-life of the subsequently concentrated dispersion or to improve the fiberizing nature of the latter. Such organic agents representatively include polyvinylpyrrolidone, polyvinyl alcohol, lactic acid, glucose (e.g., corn syrup), and mixtures thereof, these additives being oxidized and removed during the firing of the green fibers produced from such systems.

The aqueous solutions or dispersions which are used to make the refractory fibers of this invention optionally can also contain various other water-soluble metal compounds (calcinable to metal oxide) which will impart additional desired properties to the refractory fibers. For example, the optional compound can be used to reduce weight loss, adjust refractive index or dielectric properties, or to impart, without sacrifice of clarity, internal color to the final refractory upon being converted or oxidized to the corresponding metal oxide. Thus, $Cr_2O_3$ can be used together with $P_2O_5$ to minimize weight loss otherwise resulting from the latter. Ferric nitrate can be added to impart an orange to gold color, chromium formate, acetate, or trioxide to impart to the fibers a green color, cobalt acetate or nitrate to impart a blue or lavender color, vanadyl sulfate to impart a yellow color, nickel acetate to impart a blue-green or gold color, copper formate or nitrate to impart a light green to blue color, and manganese nitrate or acetate to impart a tan to brown color. (Such colored refractory fibers are useful for color coding refractory articles such as insulating sheathing for thermocouple wires). The ferric oxide-containing refractory can be reduced in a hydrogen atmosphere, the resulting reduced iron oxide or iron imparting a black color to the refractory and making it attractive to a magnet but not electrically conductive. Other optional compounds are the water soluble nitrates, formates, acetates, citrates, lactates, tartrates, or oxalates of lithium, sodium, potassium, magnesium, calcium, strontium, barium, yttrium, titanium, zirconium, chromium, manganese, iron, cobalt, nickel, copper, zinc, tin, antimony, lanthanum, and vanadium as vanadyl sulfate.

The amount of such other optional metal oxide in the refractory fibers can vary, depending upon the property effect desired, e.g., the tone of the color or hue desired, but generally will be an amount in the range of as low as 0.05 to 0.5 to as high as 3 weight percent, based on the total weight of the refractory fiber. The larger amounts of optional metal oxide additive may cause the fibers to become friable or give rise to contamination problems when the fibers are used in a particular environment. Where these other metal oxides are to be used in fibers having a boria component derived from boric acid, the precursors of said other metal oxides should be other than chlorides if they are used in significant amounts since the combination of boric acid and high chloride levels (which can be determined empirically) in the starting material generally results in frangible fibers, as discussed above.

The following is a list of representative compositions for the refractory fibers of this invention.

TABLE I

| Composition | Weight percent of oxide in composition | | | | | |
|---|---|---|---|---|---|---|
| | $Al_2O_3$ | $SiO_2$ | $B_2O_3$ | $P_2O_5$ | $Cr_2O_3$ | Other |
| 1 | 71.8 | 28.2 | | | | |
| 2 | 75 | 25 | | | | |
| 3 | 71.5 | 28 | | | 0.5 | |
| 4 | 70.5 | 28 | | | 0.5 | 1 ($SnO_2$) |
| 5 | 71.5 | 27 | | | 0.75 | 0.75 ($Sb_2O_3$) |
| 6 | 71.25 | 28 | | | | 0.75 ($Y_2O_3$) |
| 7 | 71.65 | 27.6 | | | | 0.75 ($La_2O_3$) |
| 8 | 71 | 28 | 1 | | | |
| 9 | 67 | 31 | 2 | | | |
| 10 | 70.4 | 27.6 | 2 | | | |
| 11 | 74 | 24 | 2 | | | |
| 12 | 70.4 | 27.6 | 1 | | | 1 ($Fe_2O_3$) |
| 13 | 70.4 | 27.6 | 1 | | 1 | |
| 14 | 71.5 | 27 | 0.5 | | 0.5 | 0.5 ($Fe_2O_3$) |
| 15 | 71.25 | 28 | | 0.75 | | |
| 16 | 70.4 | 27.6 | 2 | | | |
| 17 | 70.4 | 27.6 | 1 | | | 1 ($Li_2O$) |
| 18 | 72 | 26 | | 0.75 | | 1 ($Li_2O$) and 0.25 ($La_2O_3$) |
| 19 | 72.5 | 26.5 | | 0.5 | | 0.5 ($K_2O$) |
| 20 | 71.5 | 28 | | 0.25 | 0.25 | |
| 21 | 70.4 | 27.6 | 1 | | 1 | |
| 22 | 63.7 | 34.3 | 1 | | 1 | |
| 23 | 71.1 | 27.9 | | 0.5 | 0.5 | |
| 24 | 71.5 | 28 | 0.25 | 0.25 | | |
| 25 | 72 | 27.25 | 0.25 | 0.5 | | |
| 26 | 70.4 | 27.6 | 1 | 1 | | |
| 27 | 70 | 29.25 | 0.25 | 0.25 | | 0.25 ($Fe_2O_3$) |
| 28 | 70 | 29 | 0.25 | 0.25 | | 0.5 ($ZrO_2$) |
| 29 | 70 | 29 | 0.25 | 0.25 | | 0.5 ($TiO_2$) |
| 30 | 72.5 | 26.25 | 0.25 | 0.5 | | 0.5 ($Na_2O$) |
| 31 | 71.1 | 27.9 | 0.25 | 0.25 | | 0.5 (SrO, MgO, BaO, or ZnO) |

TABLE I-continued

| Composition | Weight percent of oxide in composition | | | | | |
|---|---|---|---|---|---|---|
| | $Al_2O_3$ | $SiO_2$ | $B_2O_3$ | $P_2O_5$ | $Cr_2O_3$ | Other |
| 32 | 71.25 | 28 | 0.25 | 0.25 | 0.25 | |
| 33 | 74 | 25.25 | 0.25 | 0.25 | 0.25 | |
| 34 | 75 | 24 | 0.25 | 0.25 | 0.5 | |
| 35 | 69 | 27 | 1 | 1 | 1 | 1 ($Sb_2O_3$) |

The fiber starting material, as initially prepared, will be a relatively dilute liquid, generally containing about 10 to 30 weight percent equivalent oxide solids, which can be calculated from a knowledge of the equivalent oxide solids in the raw materials and the amounts thereof used, or determined by calcining samples of the raw materials or fiber starting material. For the preparation of fibers, it is necessary to concentrate or viscosify said dilute liquid in order to convert it to a viscous or syrupy fluid concentrate which will readily gel when the concentrate is fiberized and dehydrated, for example when the concentrate is extruded and drawn in air to form fibers. The concentration step can be carried out by techniques known in the art, e.g., see said U.S. Pat. No. 3,795,524. Sufficient concentration will be obtained when the equivalent oxide solids content is generally in the range of 25 to 55, preferably less than 40, weight percent (as determined by calcining a sample of the concentrate), and viscosities (Brookfield at ambient room temperature) are in the range of 15,000 to 1,000,000 cp (centipoises) preferably 45,000 to 500,000 cp, depending on the type of fiberizing or dehydrative gelling technique and apparatus used and the desired shape of gelled fiber. High viscosities tend to result in fibers which are circular in cross-section whereas low viscosities (e.g., less than 50,000 cp) tend to result in fibers which are oval in cross-section.

In making continuous fibers, the viscous concentrate can be extruded through a plurality of orifices (e.g., 30 to 400) from a stationary head and the resulting green fibers allowed to fall in air by the force of gravity or drawn mechanically in air by means of drawing rolls or a drum or winding device rotating at a speed faster than the rate of extrusion. The concentrate can also be extruded through orifices from a stationary or rotating head and blown by parallel, oblique or tangential streams or air, such as in the making of cotton candy, the resulting blown green fibers being in staple form or short form with lengths generally 25 cm or less (rather than in long or continuous form) and collected on a screen or the like in the form of a mat. Any of these forces exerted on the extruded, green fibers, e.g., gravity, drawing, or air streams, cause attenuation or stretching of the fibers, reducing their diameter by about 50 to 90 percent or more and increasing their length by about 300 to 10,000 percent or more and serving to hasten or aid the drying of the green fibers.

The dehydrative gelling of the green fibers can be carried out in ambient air, or heated air can be used if desirable or necessary to obtain fast drying. The drying rate assists in controlling of the shape of the fiber. The relative humidity of such air should be controlled since large amounts of moisture will cause the gelled or shaped green fibers to stick together, and excessively dry atmosphere can lead to fiber breakage. Generally, air with relative humidity in the range of 20 to 60 percent can be used, at temperatures of 15° to 30° C, though such air can be heated subsequently to about 70° C or higher. In some cases, for example, where continuous green fibers are made and gathered together in parallel alignment or juxtaposition in the form of a multi-fiber strand, the fibers or strand can be treated with a size to prevent the fibers from sticking together.

Further detail in fiberizing the viscous concentrate will be omitted here in the interest of brevity since such procedures are now known, e.g., see said U.S. Pat. No. 3,760,049.

The fibers in their green or unfired gel form generally comprise about 25 to 60 weight percent equivalent oxide solids (as determined by calcining a sample) and are dry in the sense that they do not adhere or stick to one another or other substrates and feel dry to the touch. But the "dry" fibers still contain substantial amounts of water and organic material, e.g., 40 to 75 weight percent, and it is necessary to calcine or fire the green fibers in order to remove further water and organic material and convert the fibers into refractory fibers. The term "dehydrative gelling" (or "evaporative gelling"), as used herein, therefore does not mean that all the water in the green fibers is removed. Thus, in a sense, this step can be called partial dehydrative gelling. It may be noted at this point that the green fibers are transparent and clear under an optical microscope and, unless coloring additives are included in the viscous concentrate, they appear to look like colorless glass fiber. These green fibers are amorphous in that they do not contain any polycrystalline species discernible by x-ray powder diffraction analysis. The green fibers are relatively strong enough for further processing and can be collected and fired without significant breakage.

In order to remove the balance of water and organic material from the green fibers and convert them to refractory fibers, they are calcined in a furnace or kiln (preferably an electric resistance furnace), this heating being carried out usually in air or other oxidizing atmosphere at temperatures below the fusion or melting point of the $Al_2O_3$-$SiO_2$ mixture and usually at about 1000° C, or higher if desired, e.g., to 1400° C. Calcination can be accomplished in a number of ways, for example by heating in a single step from a low or room temperature to a desired elevated temperature (e.g., from room temperature to 1000° C in 20-60 minutes or more) or by heating in a series of steps at progressively higher temperatures, with or without cooling or storage between steps.

In addition to firing the fibers to convert them into their refractory oxide form, firing can also be used to obtain certain properties or results. For example, where the fibers consist essentially of $3Al_2O_3:2SiO_2$ and are to be used for service at high temperature such as 1400° C, it may be desirable to first fire them at 1200° C or higher to transfrom $\gamma$ $Al_2O_3$ (and silica in admixture therewith) to mullite and preshrink and densify the fibers, which phenomena might otherwise undesirably occur during high temperature service.

The green fibers can be calcined in a batch or continuous manner in an oriented form, such as strands or continuous yarn (a plurality of untwisted or slightly twisted parallel-aligned, virtually endless, continuous fibers) or hanks (continuous fibers or strands in coiled form), or tows (group of continuous fibers without definite twist and collected in loose form) or calcined in an irregular or random order, such as a mat of intermeshed, mechanically interlocked or tangled fibers, or calcined in the form of staple fiber.

In firing the green fibers, care should be exercised to avoid ignition of combustible material in or evolved from the fibers, for example by controlling the firing atmosphere or by starting out at a low temperature, e.g., room temperature, and then elevating the temperature at a slow rate, since such ignition may cause the formation of opaque, fragile fibers. If the green fibers are not to be fired completely in one operation or are not to be fired immediately or soon after their formation, it may be desirable or necessary to store the green fibers in a relatively dry or protective atmosphere to prevent them from picking up moisture or contaminants and deteriorating or sticking together.

The green fibers in their continuous form are preferably gathered or collected in the form of a strand, the strand then accumulated in a relaxed, loose, unrestrained configuration of offset or superimposed loops (as in a "figure 8") on a substrate and calcined in that configuration, and the strand thereafter pulled in a straight or linear form through a furnace at higher temperature, to produce refractory strands, a plurality of which can be formed into continuous yarn, all in the continuous manner described in said U.S. Patent 3,760,049.

Rather than firing the green fibers in air to remove water and organic material, they can be heated in an autoclave in an inert atmosphere, e.g., 7 to 140 kg/cm$^2$ helium, argon, or nitrogen, for example at 300° to 500° C, in order to form porous refractory fibers. Then, they can be refired in air to remove residual carbon, e.g., at 500° to 900° C, and convert them into a refractory ceramic oxide essentially free of carbon.

The calcining step volatilizes the balance of the water, decomposes and volatilizes organic material, and burns off carbon, the resultant refractory being an essentially carbon-free ceramic refractory of homogeneous chemical composition. This calcining heating step also causes some shrinking of the fibers, the amount of linear shrinkage being generally 25 percent or more, and the volume shrinkage being generally about 50 percent or more. However, the shape of the fibers during firing remains intact; for example, continuous green fibers when so fired are still of essentially continuous length.

The refractory material resulting from firing the green fibers at about 900° to 1000° C comprises crystalline material discernible by x-ray powder diffraction analysis as being predominantly $\eta$ or $\gamma$ alumina crystallites whose average size is less than 600 A (and sometimes such fibers additionally have a small amount or trace of mullite). When the green fibers are fired to 1400° C or when the 1000° C-fired fibers are further fired to 1400° C, the crystalline material is solely discernible as mullite (with crystallites whose average size is greater than 500 A). No other alumina or alumina-containing crystalline species, such as free alumina, or crystalline phase of silica, such as cristobolite, is discernible by x-ray diffraction analysis.

The refractory fibers of this invention are transparent, glossy, smooth, dense, round, stable, inert, colorless (unless colorant metal oxide additives are incorporated in the fiber precursor liquid), and have relatively low weight loss (e.g., less than about 2 weight percent) and shrinkage (e.g., less than 2.5 linear perdent) when heated or used at 1200° to 1400° C. They have useful strength, high resistance to fracturing, and are flexible, and can be handled without essentially any breakage -- the continuous fibers can be bent by hand around a rod, e.g., with a diameter of 1.5 mm or a radius of curvature of 0.75 mm, without breaking.

The refractory fibers of this invention are generally useful where fibers of high temperature stability or refractoriness are desired or required, for example up to about 1000° to 1400° C. Above 1400° C, the refractory fibers of this invention generally will begin to lose strength and flexibility after extended periods of time. However, where such losses in properties are not important for the particular application of these refractory fibers, they can be employed in such application since they will retain their solid state to temperatures above 1400° C.

The refractory fibers of this invention can be employed alone or per se in various applications in the form in which they are obtained as calcined or fired, or their physical form can be modified, e.g., chopped into staple fibers, or in their form as prepared or as modified they can be mixed or coated with or bonded to other materials.

The refractory fibers of this invention are transparent to visible light (though for some particular applications, for example where the fibers are used as a reinforcement for composites, transparency may not be important). In some applications of the refractory fibers of this invention, e.g., where a fiber or bundle of fibers are used in fiber optics, transparency will be of special importance.

In describing a refractory fiber of this invention as "transparent", this term means that the fiber when viewed under an optical microscope, e.g., with a stereoscopic microscope at 50X and oblique or transmitted light, has the property of transmitting rays of visible light. Thus, bodies beneath and contiguous with the transparent fiber, such as fibers of the same nature, can be clearly seen therethrough, the outline, periphery or edges of contiguous bodies beneath being sharply discernible. In FIG. 2 of the drawing accompanying this specification, the transparent nature of the fibers of this invention is illustrated; note that where a fiber intersects and overlays that of another, the outline of the fiber below can be sharply seen through the top fiber, as indicated, for example, by reference numbers 1 to 6.

"Opaque" fibers, on the other hand, as referred to herein are those which are impervious to visible light (and generally friable) -- contiguous bodies beneath are obscured by opaque fibers and cannot be seen therethrough. "Translucent" fibers are those whose ability to transmit light falls between transparent and opaque, and though translucent fibers have the property of transmitting visible light to some degree, and therefore are somewhat or partly transparent, contiguous bodies beneath can be seen in a diffuse manner rather than in a clearly distinguishable or sharp manner.

Sometimes, because of vagaries in firing, a fiber product may be a mixture of these various types of fibers (viz., transparent, opaque, translucent), though generally one type will be present in a predominant amount, indicative of the true nature of the mixture, the other types of products present in minor amounts having their particular appearance due to incomplete firing at the desired temperature or due to overheating because of hot spots in the furnace.

The term "fiber" in this application means a monofilament and the term "continuous fiber" means a fiber (or monofilament) which is long and has a length that is infinite for practical purposes as compared to its diameter. The continuous fibers of this invention, in green or refractory form, can be as long as 3 to 6 meters, or longer; when making continuous fibers, fibers of shorter length than this arise only from occasional flaws due to minute inhomogenities, such as foreign particles or bubbles, stemming from their presence in the viscous concentrate precursor, or from inadvertent mechanical fracture. By bringing a plurality of the continuous fibers together in the form of a continuous strand, tow, yarn, or other multifiber article, the occasional breakage or fracture of a continuous fiber does not affect the practical utility of the multi-fiber article containing a fiber whose length is relatively short. In any event, the continuous fibers of this invention, even if broken or fractured for reasons given above, can be made in lengths which are significantly longer than the length of a staple fiber.

The refractory fibers of this invention are durable and can be readily handled, e.g., for purpose of weaving fabrics. Expressed in another way, the fibers are fracture resistant. To demonstrate the fracture resistance or non-friable nature of the refractory fibers of this invention, a test procedure was developed to measure the "friability index" of a fiber product. This test measures the capability of the fiber to endure mechanical disturbances and stresses such as flexing, abrasion, and impact. This test expresses the response of the fiber to non-static conditions after exposure to high temperatures, e.g., 1000°–1400° C. The test provides a measure of the quality of the fiber when used in a "free" form, such as furnace insulation or woven and/or braided furnace belts, such forms being subjected to tensile stresses, vibration conditions, bending stresses and the like.

In determining the friability index, a sample of fibers cut to a 2.5 cm length and weighing about 0.20 ± 0.05 gram is used. The sample is placed in a glass container containing twenty-eight No.00 standard laboratory rubber stoppers (the total weight of the stoppers being 118 g), said glass container being a glass pint jar having a circumference of 24 cm. The jar is sealed with a screw cap, placed on a rubber roll ball mill, and rotated for 5 minutes at a rate of 155 to 160 rpm. During rotation, the rubber stoppers and fibers tumble together. After 5 minutes of tumbling, the jar contents are emptied onto a circular, 20 cm diameter, 20 mesh screen (U.S. Standard Sieve, with 0.84 mm openings) to separate short broken fibers or fragment from fibers which are significantly long or intact. Care is taken to thoroughly wash and rinse the emptied jar, cap, each stopper and the fibers retained on the screen to insure recovery of the long or intact fibers and removal of broken fiber residue. The wash medium is a pint of tap water (poured into the emptied jar) to which several drops of a detergent (e.g., "TERGITOL" TMN) is added. This wash medium is dumped onto the fibers and stoppers retained on the screen. The jar is then filled with tap water and it too is dumped onto the screen as a rinse, this rinsing step being repeated until no foaming of the water in the jar is observed. The washing and rinsing operation is then repeated 2 or 3 times to insure fiber recovery and separation. The stoppers are removed from the screen and residue washed therefrom onto the screen. The screen and retained fibers thereon are heated at 80°–110° C until dry, and the fibers are then removed from the screen and weighed. To insure dryness, the fibers are placed in an aluminum pan and reheated to a constant weight. The "friability index" is that number obtained by dividing the weight of the recovered fibers by the initial sample weight. A friability index of "zero" means the fiber is so fragile or weak that it breaks into short fragments or disintegrates to dust when rubbed even gently between the index finger and thumb. Where a fiber product has a friability index of zero, the test sample washes completely through the test screen, i.e., essentially no fibers are retained on the screen.

The friability index of the refractory fibers of this invention prepared by calcining green fibers by firing from room temperature to 1000° C over 1 to 2 hours is at least 0.3, preferably at least 0.5 and more preferably greater than 0.7; and the friability index of those prepared with a firing temperature of 1400° C or further fired at 1400° C for 4 hours is at least 0.2, and preferably greater than 0.5. Generally, the finer the diameter of the fiber, the greater its friability index. Fibers having these indicies are fracture resistant or essentially non-frangible (and transparent) and these fibers are useful in applications where high temperatures, e.g., 1000° to 1400° C, are encountered. For example, continuous yarns of these fibers can be braided to form a furnace belt for use in firing ceramic articles at temperatures up to 1200° C to 1400° C. Fibers with the relatively low friability indices can be used to advantage as bulk thermal insulation, whereas those with the relatively high friability indices can be used to advantage as yarn and made into woven articles, e.g., furnace belts.

In order to obtain friability indicies which are at the high end of the ranges given above, i.e., to obtain fibers which are highly non-frangible or durable, the refractory fibers of this invention preferably contain up to 2 weight percent, and more preferably about 0.5 to 1 weight percent, total of $B_2O_3$ and/or $P_2O_5$ components and they can further contain up to 1 weight percent $Cr_2O_3$, the balance being essentially the alumina-silica and, if used, small amounts of the optional metal oxide additives incorporated for coloring, etc.

In order to obtain the desired friability indices described above, it is essential that the fiberizable material be essentially free of chloride and that the alumina precursor be other than aluminum chloride. For example, refractory fibers of 100 weight percent $3Al_2O_3:2SiO_2$, or 98 weight percent $3Al_2O_3:2SiO_2$ and 2 weight percent $B_2O_3$, made from fiberizable material where the alumina precursor was aluminum metal dissolved in aluminum chloride, were found to be very fragile and had a friability index of 0 to 0.55 when calcined at 1000° C or 0 to 0.1 when further fired at 1400° C. Such fibers, unlike those made in accordance with this invention, were also found to be inhomogeneous, translucent (or opaque), and/or had relatively high surface areas even when fired at 1200° C. In this respect, note the fiber depicted in FIG. 4 — its composition was 98 weight percent $3Al_2O_3:2SiO_2$ and 2 weight percent $B_2O_3$ and it was made from fiberizable liquid derived from aluminum metal dissolved in aluminum chloride, silica sol, boric acid, and acetic acid, and calcined at 1000° C. The fiber in FIG. 4, as contrasted to the fiber of this invention shown in FIG. 3, had a friability index of zero and globular shapes, which are columnarily aligned in the core of the fiber and have a size of 2 to 5 micrometers. The fibers of FIG. 4 were very porous, as shown by the immediate penetration of immersion oil in the core; they had a surface area of 49.3 $m^3/g$ and when further fired at 1200° C were found to have a surface area of 5 $m^2/g$.

The refractory fibers of this invention as calcined or if fired to 1200° C have a very low specific surface area, indicative of the relatively non-porous and high density nature of the fibers and apparently accounting in some significant degree of their essentially non-frangible or durable nature and low weight loss and shrinkage in high temperature applications. Fibers with low surface area are desirable because of their consequent reduced tendencies to shrink in high temperature applications and to absorb or adsorb moisture, gases, or other undesirable materials which might affect their utility. For example, the low surface area refractory fibers of this invention in the form of continuous yarn will find utility in belts or insulation used in vacuum furnaces since such forms will have insignificant or reduced tendency to absorb or adsorb such impurities as would otherwise require degassing the furnace to remove such impurities. Generally, the fibers as calcined at 1000° C or further heated or calcined at 1200° C have surface areas of less than 1 m²/g (determined, for example, by nitrogen adsorption techniques, e.g., with a "QUANTASORB" Model QS-6 surface area measuring instrument). Said lower surface areas approach that of the surface area calculated from the geometry of the fibers, viz., round or oval in cross-section. Here, too, in order to obtain the lowest surface area, the refractory fibers preferably contain $B_2O_3$ and/or $P_2O_5$, and $Cr_2O_3$ components.

Another feature of the refractory fibers of this invention is that they can be made essentially carbon-free in nature, that is, with carbon present in an amount less than 0.2 weight percent, preferably less than 0.1 weight percent, and often as low as 0.05 weight percent and lower.

The continuous refractory fibers of this invention are particularly useful as yarn in fabricating woven, non-woven, felted, knitted, and other types of textiles or fabrics such as braids. Such fabricated articles generally will have the same properties, such as high strength, flexibility, refractoriness, and chemical resistance, as the fibers from which they are made. The internally colored refractory fibers will be particularly useful in decorative fabrics, such as used in clothing, upholstery, and wall covering, and for purposes of color coding or tracing. Fibers or yarns of this invention of different colors and/or composition can be used together in making fabrics with decorative designs. Fibers or yarns of this invention can be plied or inter-woven with fibers of other materials, such as metal fibers, silica fibers, glass fibers, carbon, graphite, polyimide, or polytetrafluoroethylene, if desired. Woven cloth made from the refractory fibers can be firmly bonded as wall covering to various substrates. For example, such cloths can be bonded with molten glass, or refractory cements such as zircon, aluminum oxide, phosphates, and silicates, to aluminum or other metal substrates and used as the interior walls of airplanes. The woven cloths (or mats) can also be used as layups in plastic, metal, or ceramic laminates. The fibers can also be bonded with such cements, as well as colloidal sols of alumina, titania, and silica, to form flexible ceramic papers or mats useful as thermal insulation or preforms for reinforced resin composites.

The refractory fibers of this invention can be used in the form of fabrics, mats and batting as lightweight acoustical or thermal insulation for high temperature equipment, such as resistance and induction furnaces and mufflers, and for purpose of heat shielding or reflecting, such as heating mantles and thermal curtains, and for flame shielding to prevent flame propagation through walls, e.g., compartments or fuselage of air craft.

Another area of utility for the continuous refractory fibers is that of furnace belts. Metal belts, commonly used in industry, have higher heat capacity than will those furnace belts made of the refractory fibers of this invention; thus, the latter furnace belts will require less energy for purposes of heating them to operating furnace temperatures. The furnace belts made of the refractory fibers of this invention have the further advantage over metal furnace belts in that the former will not scale (which causes contamination of fired ware).

Mats, batting, fabrics and other structures fabricated from the refractory fibers of this invention will be useful in filtering particulate matter from hot gases, such as produced by incinerators, discharge stacks from industrial or utility plants, coal gasification operations, and other operations where high temperature, particulate laden gases are discharged, for example, to the atmosphere.

Another particularly useful application for the refractory fibers of this invention is that of reinforcement for structural composites having plastic, elastomeric, metallic, or ceramic matrix, especially those composites used in high temperature environments or even hyperthermal environments found in the aerospace industry, and in ablative environments. As composite reinforcement, the refractory fibers can be used either in continuous or staple form and distributed or dispersed in the matrix as such or in a multi-fiber or fabricated form such as textile. The matrix materials which can be so reinforced include any of those heretofore used in making such composites. The plastics may be either of the thermosetting or thermoplastic types. Representative matrix materials which can be used include those listed for such purposes in said U.S. Pat. No. 3,795,524.

The invention is illustrated in the following examples. In these examples, the viscosities recited are Brookfield viscosities measured at ambient room temperature. Weight percent solids data were obtained by drying and firing a sample of the dispersion in air to about 900°–1000° C. The calculated chemical compositions of the fibers were based on the oxide equivalents of calcined samples of the oxide precursor materials used in making up the fiberizing starting materials. The firing of green fibers and the firing of refractory fibers to higher temperatures were all carried out by firing in air in an electric resistance furnace. Tensile strength data on fibers were obtained on an "Instron Testing Machine" by the application of a load on a single fiber (gauge length 2.54 cm) at a constant strain rate of 0.5 cm/min until the fiber broke. Modulus of elasticity data were obtained on single fibers (gauge length 12.7 cm) stressed in tension on the "Instron Testing Machine". The x-ray data reported are those obtained at room temperature with a Picker x-ray diffraction instrument, 816 A, at 40 kv, 30 ma, using a powder diffraction camera (Debye-Scherrer) with an effective film diameter of 14.32 cm. Unless otherwise indicated, the samples were powdered samples exposed 0.5 hour to copper K alpha radiation wavelength 1.5405 Angstroms, one-half of the film in the camera being filtered through a nickel filter. The friability index was determined by the procedure discussed above. Where crystallite sizes are given in Angstroms (A), they are estimated average sizes, based on x-ray powder diffraction line broadening. The relative intensities ($I_{rel}$) given for mullite are based on the major diffraction line 5.4, and the 3.4 doublet, and for $\eta$ or $\gamma$ alumina are based on the major diffraction line at 1.4 A. Since the diffraction lines for $\eta$ and $\gamma$ alumina are so close to one another, and the lines are so broad (or diffuse) for crystallites of the size obtained in the fibers of this invention, it is difficult to ascertain which form of alumina is actually present; thus alumina is reported as η or γ alumina.

EXAMPLE 1

Refractory fibers of $3Al_2O_3:2SiO_2$ of this invention were made as follows:

A solution was made by dissolving 92 g aluminum formoacetate ("NIACET", a calcined sample of which showed it to contain 33.2 wt % $Al_2O_3$ equivalent) in 150 g hot water (70° to 80° C). Lactic acid (7.6 g, 85 wt % aqueous solution) was stirred into the aluminum formoacetate solution and to the resulting mixture was added 37.5 g aqueous silica sol ("LUDOX" LS, 32 wt % $SiO_2$) which had been preacidified with 8 drops $HNO_3$ (70 wt %). Into the resulting mixture there was stirred 6.6 g corn syrup (which had a specific gravity of 1.42 g/cc and a viscosity of about 100,000 cp). The resulting homogeneous dispersion was filtered through a No. 54 "WHATMAN" filter paper (with water aspiration) and then pressure filtered through a 0.3 micrometer cartridge filter. The resulting filtered dispersion was concentrated in a "ROTAVAPOR" flask to a fiberizable condition (viscosity estimated to be 40,000 to 50,000 cp) and air bubbles were removed by centrifuging the resulting liquid concentrate for 15 min at 1800 rpm. The concentrate was then extruded at a pressure of about 14 kg/cm² through a 30-hole spinnerette having 0.1 mm diameter holes and the extruded fibers were driven by and collected on a 61 cm diameter rotating drum at a linear rate of 67 m/min, the drum being located about 2 m below the spinnerette. Prior to being wound on the drum, the extruded, drawn continuous green fibers passed through a vertical drier stack which had an inside diameter of about 17.8 cm and a length of about 122 cm. Air from a compressor system was passed through a silica gel drier and then passed up through a drier stack (without added heat) at a rate of about 0.085 m³/min while the fibers were drawn downwardly in the drier stack.

A portion of the continuous green fibers was cut from the drum as a bundle of fibers, with lengths of 20 to 25 cm. The green fibers were transparent and round in cross-section. The bundle was calcined in air from room temperature (RT) to 1000° C over a 1 hr period of time in an electric furnace (Model 51442, 4880 watts, 230 volts, manufacture by Lindberg Division, Sola Basic Industries, Watertown, Wisconsin). The rate of temperature increase during calcining was as follows:

| Time elapse, min: | | | | | | | | | | |
|---|---|---|---|---|---|---|---|---|---|---|
| 0 | 15 | 21 | 27 | 32 | 38 | 44 | 50 | 57 | 60 | |
| Temperature, ° C: | | | | | | | | | | |
| RT | 400 | 500 | 600 | 680 | 750 | 830 | 900 | 975 | 1000 | |

The calcined bundle of refractory fibers was removed from the hot furnace within 10 min after reaching 1000° C and cooled in ambient air. The cooled bundle of refractory fibers was off-white in color (i.e., slightly tan), soft and flexible and individual fibers in the bundle were found to be clear, shiny, smooth, and transparent when examined under a stereoscopic microscope at 60X. The fibers had a uniform diameter of about 15 micrometers and felt very strong when grasped between the index finger and thumb of each hand and pulled until a break occurred. Under 300X examination with a petrographic microscope, the fibers were found to be so porous (immersion oil penetrated rapidly) that the index of refraction was difficult to measure. The fibers $(3Al_2O_3:2SiO_2)$ had a calculated composition of 71.8 wt % $Al_2O_3$ and 28.2 wt % $SiO_2$. FIG. 2 represents (at 100X) how the 1000° C-fired fibers appeared under an optical microscope (50X) when immersed in oil having an index of refraction of 1.60 and illuminated with transmitted light, the sketch depicting the transparency, clarity, smoothness, and uniformity of the fibers.

A portion of the 1000° C-fired fibers was placed in an alumina boat and fired in air in a "GLOBAR" electric furnace from room temperature to 1200° C in about 2 hr and held at 1200° C for 30 min. The thus further fired refractory fibers were withdrawn from the furnace and allowed to cool in ambient air. The 1200° C-fired fibers were whiter than the 1000° C-fired fibers, but otherwise looked much like the 1000° C-fired fibers.

Another portion of the 1000° C-fired fibers was similarly fired in air from room temperature to 1400° C in the "GLOBAR" electric furnace over a period of about 3 hr and soaked at 1400° C for 4 hr. The thus further fired fibers were withdrawn from the furnace and cooled in ambient air. These 1400° C-fired fibers could be handled without breaking, felt fairly strong, appeared white to the unaided eye and were colorless, transparent, and round in cross-section under a stereoscopic microscope at 60X. When examined under an optical microscope at 50X in the same manner described above for the 1000° C-fired fibers, the 1400° C-fired fibers looked just like those depicted in FIG. 2. Under examination with a petrographic microscope at 300X, the fibers had a uniform microcrystalline structure, no discernible skin effect, and had an index of refraction of about 1.636.

Further data on the above-described fibers are summarized in Table II.

Table II

| | Properties of fibers | | | |
|---|---|---|---|---|
| Fibers | Crystalline phase, X-ray analysis | Surface area m²/g | Density g/cm³ | Friability index |
| 1000° C-fired | only η or γ gamma alumina (crystallites <600 A) | 33.8 | 2.48 | 0.78 |
| 1200° C-fired | predominantly mullite ($I_{rel}$100; crystallites ca 1000 A) plus small amt. of η or γ alumina ($I_{rel}$4; crystallites <600 A) | 0.20 | 2.75 | — |
| 1400° C-fired | only mullite (crystallites ca 1000 A) | 0.21 | 3.15 | 0.72 |

EXAMPLE 2

Refractory fibers of $3Al_2O_3:2SiO_2$ were made as follows:

To a mixture of 300 ml formic acid (97%) and 3000 ml deionized water was added 454 g aluminum isopropylate. The resulting solution had an $Al_2O_3$ equivalent of 3.49 wt %. To 2150 g of this solution was added 247 g aluminum formoacetate ("NIACET", 30.4 wt % $Al_2O_3$ equivalent) with subsequent heating to 60° C until the solution was clear. After cooling the resulting solution to 30° C, there were added 1500 g aqueous colloidal alumina sol ("NALCO" LN-1331-256, about 10 wt % $Al_2O_3$), 393 g aqueous colloidal silica ("LUDOX" LS, 30 wt % $SiO_2$), and 125 ml lactic acid (85 wt %). The resulting mixture was filtered through a No. 54 "WHATMAN" filter paper. The filtered liquid was concentrated under vacuum in a "ROTAVAPOR" flask immersed in a water bath at a temperature of 35° to 40° C to yield liquid concentrate with a viscosity of 50,000 cp (at 29° C). The concentrate was centrifuged to remove air bubbles. According to the general procedure disclosed in said U.S. Pat. No. 3,760,049, the concentrate was then fiberized to form fibers which were fired to form refractory fibers. In following that procedure, the concentrate was fed to a 130-hole spinnerette, having 0.076 mm diameter holes, at about 14.06 kg/cm² and extruded therefrom. The resulting extruded fibers were drawn vertically downward through the center of a drier stack, about 1.5 m in length and 30.5 cm in diameter, in a countercurrent stream of dry air introduced into the bottom end of the stack at about 40° C and exhausted from the upper end of the stack at about 30° C. Air flow was about 17 liter/sec and the air had about 40% relative humidity. The green continuous fibers issuing from the bottom of the stack were brought together by a thread guide to form a compact strand of 130 fibers, and passed over a roller applicator coated with an inert fluorocarbon boiling at about 180° C (designated "FC 40" by its supplier, Minnesota Mining & Manufacturing Company) mixed with a small amount (0.5 wt %) of chlorofluorocarbon oil (sold under the trademark "HALOCARBON OIL" Series 13.21). The lubricated strand was passed over a pair of counter-rotating drawing rolls, each 61 cm in diameter, to draw the fibers at about 40 m/min. The strand was allowed to fall about 1 m and accumulate in a relaxed, free-form manner on a horizontally moving, continuous belt. The moving belt was an open mesh skrim of nylon, about 23 cm in width. As the belt moved, the strand continuously collapsed thereon, the lower end of the strand moving back and forth laterally on the belt and accumulating thereon in the form of offset figure 8 loops. The belt continuously passed around a perforated stationary cylinder at one extremity and around a drive roll at the other extremity. As the accumulated pile of the strand on the belt reached the extremity of its travel adjacent the stationary cylinder, it was held on the belt by a slight vacuum obtained by drawing air through the belt into the cylinder, holding the pile on the belt until the pile reached its lower-most point of travel. Thereupon the pile continuously fell from the belt under gravity and deposited on a horizontally moving belt made of a sheet of stainless steel which moved in a direction opposite to the direction that the top of the skrim belt moved when the strand was initially accumulated. A static eliminator bar was located adjacent the outer surface of the cylinder at a point just beyond that where the pile dropped from the skrim belt. The pile on the stainless steel belt retained its relaxed configuration except that it in effect was turned over. The stainless steel belt carried the pile at 30 cm/min through a "pre-fire furnace", viz., a four-zone electric panel furnace, each zone being 1.8 m long. The entry temperature of the first zone of the furnace was about 200° C and its hottest point was about 320° C. In this first zone, the pile was fired in air to remove water and other volatile material such as solvents, to initiate the decomposition of organic material, and to initiate the sintering of the fibers. In the second, third, and fourth zones of the furnace, the temperature gradually increased to about 870° C, causing removal of residual volatile material and the conversion of the strand into a refractory strand. The firing resulted in linear shrinkage (about 38%). During the firing, the strand went through brown and black discolorations and finally became white to the unaided eye and clear and transparent under an optical microscope. The fired strand of fibers exiting from the furnace was pulled from the stainless steel belt through a series of variable tensioning cylinders and passed as a straight, taut strand through a 2.4 m long tube furnace maintained at about 950° C. The rate of travel through the tube furnace was about 24 m/min. As the strand passed through the tube furnace, kinks were removed therefrom and the strand straightened. After discharge from the tube furnace, a toluene solution of 0.5 wt % "KRATON" 1107 butadiene-isoprene block copolymer rubber and 2.5 wt % mineral oil was applied to the strand and the sized strand wound around a core. The fibers in the thus fired strand were continuous, transparent, clear, colorless, glossy, round, and strong. Individual fibers of the refractory strand had an average diameter of 10 to 12 micrometers. The calculated composition of the fibers was 71.8 wt % $Al_2O_3$ and 28.2 wt % $SiO_2$.

Samples of the 950° C-fired strand were placed in an electric resistance furnace and fired in the air to 1600° C over about a 2 hr period while samples were removed at 100° C-intervals for measurement of tensile strength and individual fiber diameter. These measurements are shown in Table III.

Table III

| Temperature to which sample was fired, ° C | Properties of fired fibers | |
|---|---|---|
| | Tensile strength,* kg/cm² | Average fiber diameter,** μm |
| 1100 | 10,124 | 10.9 |
| 1200 | 12,796 | 10.7 |
| 1300 | 14,272 | 9.9 |
| 1400 | 13,780 | 9.7 |
| 1500 | 13,007 | 9.4 |
| 1600 | 8,788 | 9.1 |

*Value given is average of six measurements on 2.54 cm gauge samples using "INSTRON" testing machine.
**Average is of six measurements.

Other samples of the 950° C-fired strand were fired in air at higher temperatures for various periods of time and similar measurements were made on the fired samples, as shown in Table IV.

Table IV

| Firing | | Properties of fired fibers | |
|---|---|---|---|
| Temperature ° C | Duration hr | Tensile strength,* kg/cm² | Average fiber diameter,** μm |
| 1300 | 16 | 8,718 | 9.9 |
| 1400 | 1 | 11,460 | 9.7 |
| 1400 | 2 | 13,007 | 9.7 |
| 1400 | 4 | 8,085 | 9.4 |
| 1400 | 16 | 9,632 | 9.9 |
| 1500 | 16 | 5,273 | 9.9 |

* ** See Table III for footnotes.

The 950° C-fired fibers were refired in air in an electric furnace from room temperature to 1000° C over a period of about 1 hour and a portion of these refired from room temperature to 1400° C and held at that temperature for 4 hours.

The fibers fired to 1000° C were white to the unaided eye, strong, and when examined under a stereoscopic microscope at 60X they appeared clear, transparent, shiny, and smooth. They were found to have 0.03 wt % carbon, a surface area of 26.3 m²/g, and a friability index of 0.62.

A portion of the 1000° C-fired fibers was further fired in air to 1200° C over a period of about 2 hours and held at 1200° C for one-half hour. These 1200° C-fired fibers and a tensile strength of 8860 kg/cm² and an average diameter of 11.25 micrometers.

Several individual strands of these 1000° C-fired fibers about 7.5 to 10 cm long were attached to platinum wire and inserted into a "GLOBAR" furnace which had been preheated to 1500° C. Samples were inserted for 5, 10, and 15 seconds respectively and quickly withdrawn to ambient air. The x-ray data obtained on these various 1500° C-fired fibers are summarized in Table V.

Table V

| Length of time fibers heated at 1500° C, sec. | Crystalline phase, x-ray analysis |
|---|---|
| 5 | predominantly mullite ($I_{rel}$100; crystallites <800 A) with small amount of η or γ alumina ($I_{rel}$10; crystallites <600 A) |
| 10 | predominantly mullite crystallites ($I_{rel}$100; crystallites <800A*) with small amount of η or γ alumina ($I_{rel}$2; crystallites <600 A) |
| 15 | only mullite (crystallites <800 A) |

*By electron microscopy, the mullite crystallite size was in the range of 150 to 1250 A.

EXAMPLE 3

Refractory fibers of this invention having a composition of 98 wt % $3Al_2O_3:2SiO_2$ and 2 wt % $B_2O_3$ were prepared as follows.

An aluminum formoacetate solution was made by dissolving 92 g "NIACET" in 150 ml hot water (80° C). Aqueous lactic acid (7.6 g, 85 wt % lactic acid) was stirred into this solution and followed by the addition of 37.5 g aqueous colloidal silica sol ("LUDOX" LS) which had been preacidified with 8 drops $HNO_3$ (70%). Corn syrup (6.6 g) was added to this dispersion and stirred for homogenation. An aqueous boric acid solution (1.54 g $H_3BO_3$ in 40 ml water) was mixed in and the resulting liquid mixture was filtered through a No. 54 "WHATMAN" filter paper (with water aspiration) and then pressured through a 0.3 micrometer cartridge filter. The filtered dispersion was concentrated in a "ROTAVAPOR" flask to a viscosity of 33,000 cp and centrifuged to remove air bubbles.

The resulting clear concentrate was extruded through a 30-hole spinnerette having 0.1 mm diameter holes at a pressure of 14.06 kg/cm² and drawn by and collected on a 61 cm diameter drum (located about 2 m below the spinnerette) at a linear rate of 76 m/min. The drawn green fibers passed through a vertical drier stack as in Example 1 prior to being collected on the drum.

The dried green fibers were removed from the drum as a bundle and fired in an electric kiln from room temperature to 1000° C over a period of 1 hr.

The fired fiber bundle appeared white to the unaided eye and was very soft and flexible. Under a stereoscopic microscope at 60X, the fibers were transparent, clear, colorless, shiny, smooth, oval in crossection, and had an average diameter of about 15 micrometers. The fibers were found to be very strong when pulled between the fingers. The calculated composition of the fibers was 70.4 wt % $Al_2O_3$, 27.6 wt % $SiO_2$, and 2 wt % $B_2O_3$.

FIG. 3 is a representation (at 600X) of the 1000° C-fired as they appear under an optical microscope (at 300X) with bright field illumination. The representation of FIG. 3 shows the fibers to be smooth (there being no discernible irregularity or roughness on the surface) and homogeneous (there being no discernible optical irregularities, e.g., pores or separated phases).

Under examination with a petrographic microscope at 300X, the 1000° C-fired fibers were found to have a pronounced skin effect, that is, the index of refraction of the skin or outer surface of the fibers, was different than the index of the cores, the index of the skin being greater than 1.564 and that of the core being less than 1.564 and estimated to be about 1.560. There was no discernible penetration of immersion oil after 5 min.

A portion of the 1000° C-fired fibers was further fired from room temperature to 1210° C in a "GLOBAR" furnace and held at 1210° C for 4 hr. These were further fired by replacing them in the furnace, previously elevated to 750° C, and raising the temperature to 1400° C over a 2 hr period, and holding at 1400° C for 4 hr. The 1400° C-fired fibers were still soft, flexible, shiny, very handleable, fracture resistant, transparent, and water clear. Under examination with a petrographic microscope at 300X, the fibers were found to be still homogeneous and contained very fine microcrystallites.

Part of the 1000° C-fired fibers was further fired from 1080° C to 1200° C in the "GLOBAR" furnace and held at 1200° C for ½ hr. The resulting fibers locked and felt like those fired at 1000° C.

The data obtained on the fired fibers are set forth in Table VI.

Table VI

| Fibers | Properties of fibers | | | |
|---|---|---|---|---|
| | Crystalline phase, x-ray analysis | Surface area, m²/g | Density, g/cm³ | Friability index | Spectrographic analysis, wt % B |
| 1000° C-fired | η or γ alumina (crystallites >600 A)* | 0.21 | 2.59 | 1.0 | 0.74 |
| 1200° C-fired | mullite (crystallites <1000 A)** | — | — | — | — |
| 1400° C-fired | mullite (crystallites ≦1000 A) | 0.12 | 3.00 | 0.37 | 0.42 |

*A Laue pattern (of unpowdered, parallel fibers) showed the presence of mullite and η alumina. Electron microscopy showed crystallite size in the range of 60 to 130 A.
**Electron microscopy showed size of crystallite in the range of 180 to 1000 A.

EXAMPLE 4

Refractory fibers of 74 wt % $Al_2O_3$, 24 wt % $SiO_2$, and 2 wt % $B_2O_3$, were prepared as follows.

An aqueous solution of aluminum formoacetate was made by adding 1287.1 g "NIACET" to 1700 ml water and heating to dissolve the "NIACET". The resulting solution was cooled and 145.5 g basic aluminum acetate ("NIAPROOF") was stirred into the solution, followed by mixing in a mixture of 480 g aqueous colloidal silica ("LUDOX" LS) and 137 g lactic acid. One-hundred-eleven g corn syrup was stirred into the resulting mixture. The resulting mixture was filtered through a No. 54 "WHATMAN" filter paper, concentrated to a viscosity of 150,000 cp (at 21° C), and centrifuged, and the resulting liquid concentrate was fiberized and fired first in a three-zone furnace and then in a tube furnace, all by the procedure of Example 2. In following that procedure, there was used: a 130-hole spinnerette with 0.076 mm diameter holes, an extrusion pressure of about 7 kg/cm$^2$, a drier stack temperature of about 60° C, a maximum pre-fire furnace temperature of about 900 to 1000° C (in the third zone of the furnace), a furnace belt speed of 25 cm/min, and a tube furnace temperature of 850° C.

These 850° C-fired fibers were found to have a diameter of 10 to 11 micrometers, a surface area of 0.28 m$^2$/g, a tensile strength (2.54 cm gauge length) of 11880 kg/cm$^2$, a modulus of elasticity of 1.5 × 10$^6$ kg/cm$^2$, and a friability index of 0.97. Petrographic microscope examination (300X) showed the fibers to be very homogeneous with no discernible skin effect, to have an index of refraction of about 1.625, and after 5 to 10 min in immersion oil, no penetration of the oil was observed. A portion of these fibers was further fired in air at 1400° C for 4 hr and these further fired fibers were found to have a friability index of 0.38.

Samples of the 850° C-fired strand of fibers were further heated at 1400° C and 1500° C and these further fired fibers had the tensile strengths shown in Table VII.

Table VII

| Temperature fibers were further fired, ° C | Duration of further firing, hr | Tensile strength* of further fired fibers, kg/cm$^2$ |
|---|---|---|
| 1400 | 1 | 8,859 |
| 1400 | 4 | 9,491 |
| 1400 | 24 | 10,335 |
| 1400 | 80 | 7,312 |
| 1500 | 1 | 10,687 |
| 1500 | 4 | 9,210 |
| 1500 | 24 | 5,695 |
| 1500 | 80 | —** |

*Value given is average of 6 measurements on 2.54 cm gauge samples, using "INSTRON" testing machine.
**Further fired sample was too frangible for measurement.

Samples of the 850° C-fired strand were made into yarn. The yarn was braided, and the braids were fired in air from room temperature to 1400° C and the loss in weight and amount of shrinkage were determined after various periods at 1400° C. Each braid sample was about 15 cm long and formed by braiding by hand 3 lengths of yarn (with 6 to 8 cross-overs every 2.54 cm), each length of yarn being made of 10 of the 850° C-fired strands. Results are shown in Table VIII.

Table VIII

| Duration of firing at 1400° C | Properties of 1400° C-fired braids | |
|---|---|---|
| | % weight loss | % linear shrinkage |
| 1 min | 0.01 | 1.06 |
| 1 hr | 0.17 | 1.06 |
| 5 hr | — | 1.06 |
| 19 hr | 1.13 | 2.15 |
| 43 hr | 1.42 | 2 15 |
| 115 hr | 1.72 | 2.15 |

The data shown in Tables VII and VIII show that even at elevated temperatures for long periods of time the fibers had minimal weight loss and shrinkage and retained their strength. Consistent with these properties, the braids retained sufficient flexibility to permit their application at high temperatures where flexibility is required, e.g., as heat zone dividers or conveyor belts in a high temperature processing furnace.

A sample of the 850° C-fired strand was used to make a unidirectional epoxy prepneg (that is, a layer of parallel strands interposed between two sheets of heat curable epoxy novolak resin). Twelve plys of prepreg were laid up in a unidirectional manner and were heat cured under vacuum at 176° C and 5.62 kg/cm$^2$ for 1 hr to form a composite containing 50.8 volume % fibers. The flexural modulus of the cured composite was found to be 0.8 × 10$^6$ kg/cm$^2$ and the flexural strength was found to be 7.8 × 10$^3$ kg/cm$^2$.

EXAMPLE 5

Refractory fibers of 70.4 wt % Al$_2$O$_3$, 27.6 wt % SiO$_2$ and 2 wt % B$_2$O$_3$ were prepared as follows.

An aqueous solution of aluminum formoacetate was made by adding 700 g "NIACET" to 800 ml water and heating the mixture to 60° C to dissolve the "NIACET". After stirring 11.1 g H$_3$BO$_3$ into the resulting solution, it was cooled to 30° to 35° C. Then 278.6 g aqueous colloidal silica ("LUDOX" LS, 30 wt % SiO$_2$), 66 g lactic acid, and 53.2 g corn syrup were added and mixed into the solution in turn. The resulting mixture was filtered, concentrated to a viscosity of 120,000 cp (at 22° C), and centrifuged and the resulting liquid concentrate was fiberized and fired, all by the procedure described in Example 4. In following that procedure, there were used a 130-hole spinnerette with 0.076 mm diameter holes, an extrusion pressure of about 7 kg/cm$^2$, a drawing rate of 56 m/min, a maximum prefiring temperature of 980° C (in the third zone of the furnace), a furnace belt speed of 0.3 m/min, and a tube furnace temperature of 800° C, the strand of fibers being pulled through the tube furnace at a linear rate of about 37 m/min.

The resulting fired strand appeared white and shiny to the unaided eye and under stereoscopic microscope examination at 60X the fibers looked clear, transparent, colorless, and smooth. The individual fibers in the strand had diameters of about 10 to 10.5 micrometers, tensile strengths (2.54 cm gauge length) of 12.2 × 10$^3$ kg/cm$^2$, and modulus of elasticity of 1.36 × 10$^6$ kg/cm$^2$. The surface area of the fibers was found to be 0.23 m$^2$/g.

EXAMPLE 6

Refractory fibers of 67 wt % Al$_2$O$_3$, 31 wt % SiO$_2$, and 2 wt % B$_2$O$_3$ were made as follows.

An aqueous solution of aluminum formoacetate was made by adding 1149 g "NIACET" to 1500 ml water and heating the mixture to dissolve the "NIACET". The resulting solution was cooled to about 35° C and 145.4 g basic aluminum acetate ("NIAPROOF") was stirred into the solution, followed by mixing in 620 g aqueous colloidal silica ("LUDOX" LS, 30 wt % SiO$_2$) which had been acidified with 125 g lactic acid. Onehundred g corn syrup ("KARO") was stirred into the resulting mixture. The resulting mixture was filtered, concentrated to a viscosity of 75,000 cp (at 25° C), and centrifuged and the resulting liquid concentrate was fiberized and fired, all by the procedure described in Example 4. In following that procedure, there were used a 130-hole spinnerette with 0.076 mm diameter holes, an extrusion pressure of about 7 kg/cm$^2$, a drawing rate of 61 m/min, a drier stack temperature of 60° C, a maximum prefire furnace temperature of 1000° C (in the third zone of the furnace), a furnace belt speed of .18 m/min, and a tube furnace temperature of 850° C, the strand of fibers being pulled through the tube furnace at a linear rate of 36.6 m/min.

The resulting fired strand and the fibers thereof appeared like those of Example 5. The fibers had a surface area of 0.147 m$^2$/g and a friability index of 0.82.

Braids of the fired strand were made, fired at 1400° C, and the loss in weight and the amount of shrinkage of the braids after various periods at 1400° C were determined, following the same braid evaluation described in Example 4. Results of the braid evaluation are summarized in Table IX.

Table IX

| Duration of firing at 1400° C | Properties of 1400° C-fired braids | |
|---|---|---|
| | % weight loss | % linear shrinkage |
| 1 min | 0.07 | 1.07 |
| 1 hr | 0.04 | 1.07 |
| 5 hr | 0.26 | 1.07 |
| 19 hr | 0.64 | 2.12 |
| 43 hr | 1.18 | 2.12 |
| 115 hr | 1.51 | 2.12 |

These data show the fibers had minimal weight loss and shrinkage when exposed for long periods at elevated temperatures, making them useful in high temperature applications.

EXAMPLE 7

Refractory fibers of 99 wt % $3Al_2O_3 \cdot 2SiO_2$ and 1 wt % $B_2O_3$ were prepared as follows.

Aluminum formoacetate (6510 g "NIACET", 32 wt % $Al_2O_3$ equivalent) was dissolved in 10 liters hot water and the resulting solution was cooled to room temperature. To this solution was slowly added 364 g basic aluminum acetate ("NIAPROOF", 44.5 wt % $Al_2O_3$ equivalent) and dissolved therein. A mixture of 2675 g aqueous colloidal silica ("LUDOX" LS, 30 wt % $SiO_2$) and 654 g lactic acid (88%) was added to the mixed acetate solution, followed by addition of 527 g corn syrup. The resulting dispersion was filtered through a No. 54 "WHATMAN" filter paper and then concentrated in a "ROTAVAPOR" flask to yield a liquid concentrate having a viscosity of 145,000 cp (at 23° C). The concentrate (warmed to ambient temperature after having been stored at −34° C) was then fiberized and the resulting green fibers were fired, following the procedure of Example 4. In following that procedure, the concentrate was extruded at about 33° C from a 130-hole spinnerette (having 0.076 mm diameter holes), the extruded fibers being drawn downwardly at a linear rate of about 61 m/min through a drier stack countercurrent to a stream of air having a temperature of about 50° C at the top of the stack. The green fibers were gathered as a strand at a point below the stack and the strand sized with an inert fluorocarbon boiling at about 100° C (designated "FC-75" by its supplier, Minnesota Mining & Manufacturing Co.) mixed with a small amount (1.5 wt %) of the chlorofluorocarbon oil used in Example 2. The strand was accumulated on a belt as in Example 2 and passed at a rate of about .18 cm/min into a prefire furnace where the maximum temperature was 870° C (in the third zone). The resulting continuous refractory strand was then passed through a tube furnace, as in Example 2, where it was further fired in air at 930° C while being pulled therethrough in a taut manner to remove kinks, and the thus fired strand, sized as in Example 2, was wound on a spool.

A portion of the 930° C-fired strand was further fired in air from room temperatue to 1000° over a 1 hr period. The fibers of this further fired strand appeared white and shiny to the inaided eye, had a carbon content of 0.04 wt %, had average diameters of 12 to 15 micrometers, and felt fairly strong. Under a stereoscopic microscope at 60X, the 1000° C-fired fibers appeared clear, colorless, and transparent.

A portion of the 1000° C-fired fibers was further fired in air at 1400° C for 4 hrs. These further fired fibers was still colorless, clear, transparent, and fairly shiny. Some of the 1000° C-fired fibers were further fired for periods of 5 to 15 sec at 1500° C.

Other properties of the above-described fibers are set forth in Table X.

Table X

| | Properties of fibers | | | |
|---|---|---|---|---|
| Fibers | Crystalline phase, X-ray analysis | Spectroscopic analysis, wt % B | Surface area, m²/g | Friability index |
| 1000° C-fired | η or γ $Al_2O_3$ (crystallites <600 A) | 0.35 | 0.24 | 0.57 |
| 1400° C-fired | mullite (Crystallites ca 1000 A) | 0.25 | — | 0.22 |
| 1500° C-fired | mullite (crystallites <1000 A*) | — | — | — |

*The fibers fired at 1500° C for 10 sec had mullite crystallites of 625 to 2220 A by electron microscopy.

EXAMPLE 8

Refractory fibers of 99.5 wt % $3Al_2O_3 \cdot 2SiO_2$ and 0.5 wt % $Cr_2O_3$ of this invention were made as follows.

To 2006 g of an aluminum isopropylate solution (made by dissolving 454 g aluminum isopropylate in a mixture of 3000 ml water and 300 ml of 97 wt % formic acid) 230 g "NIACET" (containing 30.4 wt % $Al_2O_3$ equivalent) were added. The mixture was heated to 60° C, forming a clear solution. The solution was cooled to 30° C and to it were added 1400 g aqueous colloidal alumina sol ("NALCO" LN-1331-256, having about 10 wt % $Al_2O_3$), 367 g aqueous colloidal silica ("LUDOX" LS, 30 wt % $SiO_2$), 9.6 g aqueous chromium acetate solution (20.4 wt % $Cr_2O_3$ equivalent), and 105 ml lactic acid (88 wt %). The resulting solution was filtered through a No. 54 "WHATMAN" filter paper and concentrated under a vacuum to a viscosity of about 75,000 cp (at 25° C).

The resulting liquid concentrate was centrifuged to remove air bubbles and then following the procedures of Example 2 was fiberized to form fibers which were fired. In making the fibers, there were used a 130-hole spinnerette with 0.076 mm diameter holes, extrusion pressure of about 10.6 kg/cm², a drier stack temperature of about 60° C, a maximum prefire furnace temperature of about 910° C (in the 4th zone), a furnace belt speed of about 31 cm/min, and a final temperature in the tube furnace of about 950° C.

Samples of the 950° C-fired fibers were further fired in air to 1000° C over a period of 1¾ hr and held at 1000° C for one-fourth hr. The further fired fibers were found to have a diameter of 10–12 micrometers, a surface area of 17 m²/g, a friability index of 0.90, and a tensile strength of about 12.3 × 10³ kg/cm² (using a gauge length of 2.54 cm).

Other samples of the 950° C-fired fibers were further fired in air at temperatures of 1300 to 1500° C for various periods of time and the tensile strengths of the further fired fibers were determined. It was found that the fibers and high tensile strengths of about 7,000 to 10,500 kg/cm² at temperatures up to 1400° C (and increased in tensile strength when fired about 4 hr at 1400° C). When fired for extended periods (e.g., 16 hr) at 1400° C and up to 1500°-1600° C, the tensile strength decreased.

EXAMPLES 9-19

In each of a series of runs (Examples 9-19), refractory fibers of 96 to 99.5 wt % $3Al_2O_3:2SiO_2$ plus small amounts of one to three other oxides, viz., $P_2O_5$, $B_2O_3$, $Cr_2O_3$ and $Fe_2O_3$, were prepared as follows.

In each run, an aqueous mixture of aluminum formoacetate, aqueous colloidal silica, lactic acid, corn syrup, and the precursors of said oxides (in amounts added to give the corresponding small amounts in the refractory fibers) were filtered and concentrated in a "ROTAVAPOR" flask to a viscosity in the range of 22,000 to 118,000 cp.

The $Al_2O_3$ precursor in each example of the series was "NIACET" and the $SiO_2$ precursor was "LUDOX" LS (preacidified with $HNO_3$). The $P_2O_5$ precursor used was $NH_4H_2PO_2$, except in Example 13 where $H_3PO_4$ was used. The $B_2O_3$ precursor used was $H_3BO_3$ except in Example 19 where the $B_2O_3$ precursor was "NIAPROOF". The $Cr_2O_3$ precursor was $CrO_3$ (which when added to the aqueous starting material formed chromic acid) and the $Fe_2O_3$ precursor (in Example 18) was $FeCl_3.6H_2O$. Corn syrup and lactic acid were also used as in the previous examples.

Each liquid concentrate in the series was extruded at pressures in the range of 7 to 28 kg/cm² from a 30-hole spinnerette (with 0.1 mm diameter holes) and the extruded fibers drawn downwardly at 61 to 92 m/min and wound on a drum (61 cm in diameter). A bundle of green fibers was cut from the drum in each run and fired in air at various temperatures (1000° C, 1200° C, 1400° C) to obtain refractory fibers.

Except as otherwise noted in Table XI, which further summarizes Examples 9-19 and the results obtained, the refractory fibers obtained by firing the fibers according to the foregoing firing schedules were strong and flexible and under stereoscopic examination were found to be clear, transparent, shiny, and smooth and they had average diameters in the range of 12 to 15 micrometers. The fired fibers of these examples were colorless except for those which contained $Cr_2O_3$, which were light green in color, or contained $Fe_2O_3$, which were light gold in color.

Table XI

| EX | Fiber composition, calc. wt% $3Al_2O_3:2SiO_2$ | $P_2O_5$ | $B_2O_3$ | $Cr_2O_3$ | X-ray analysis 1000° C | 1200° C | 1400° C | Surface area, m²/g 1000° C | 1200° C | 1400° C | Friability index 1000° C | 1200° C | 1400° C |
|---|---|---|---|---|---|---|---|---|---|---|---|---|---|
| 9 | 99.25 | 0.75 | | | η or γ $Al_2O_3$ | predom. mullite[n] | mullite | 0.13 | — | — | 0.93 | 0.93 | 0.31 |
| 10 | 98 | 2 | | | η or γ $Al_2O_3$ | predom. $\delta Al_2O_3$[q] | mullite | 0.24 | — | 0.21 | 0.84[a] | 0.89 | 0.23[b] |
| 11 | 99.5 | 0.25 | | 0.25 | η or γ $Al_2O_3$ | predom. η or γ $Al_2O_3$[o] | — | 1.89 | 0.19 | — | 0.97 | — | 0.4 |
| 12 | 99 | 0.5 | | 0.5 | η or γ $Al_2O_3$ | $\delta Al_2O_3$ | mullite | 0.23 | — | — | 0.88 | —[e] | 0.24 |
| 13 | 99 | 0.5[l] | | 0.5 | η or γ $Al_2O_3$[r] | — | mullite | — | — | — | 0.98[f] | — | 0.43[g] |
| 14 | 98 | 1 | | 1 | η or γ $Al_2O_3$ | predom. $\delta Al_2O_3$[q] | mullite | 0.18 | — | 0.17 | 0.96[c] | — | 0.67[d] |
| 15 | 96 | 2 | | 2 | η or γ $Al_2O_3$ | — | mullite | — | — | — | 0.93 | — | 0.04[i] |
| 16 | 99.5 | 0.25 | 0.25 | | η or γ $Al_2O_3$ | predom. mullite[r] | — | 5.05 | 0.18 | — | 0.95 | — | 0.78[i] |
| 17 | 98 | 1 | 1 | | η or γ $Al_2O_3$ | — | mullite | — | — | — | 1.0 | — | 0.42[i] |
| 18[m] | 98 | | 1 | | η or γ $Al_2O_3$ | — | mullite | — | — | — | 1.0[j] | — | 0.31[i] |
| 19 | 99.25[k] | 0.25 | 0.25 | 0.25 | η or γ $Al_2O_3$ | predom. mullite[n] | mullite | 0.25 | — | — | 0.92 | 0.81 | 0.25[i] |

[a]1000° C-fired fibers had density of 2.56 g/cc.
[b]1400° C-fired fibers were transparent with slight haziness and had density of 3.07 g/cc.
[c]1000° C-fired fibers had density of 2.48 g/cc.
[d]1400° C-fired fibers had density of 3.16 g/cc.
[e]1200° C-fired fibers had tensile strength of 17,557 kg/cm², (2.54 cm gauge sample), and modulus of elasticity of 2.07 × 10⁶ kg/cm², (12.7 cm gauge sample), as measured on "INSTRON" testing machine.
[f]Petrographic microscope examination (300×) showed the 1000° C-fired fibers to have an index of refraction of about 1.572 with slight oil penetration in the cores of the fibers through the borken ends; and after soaking in 1.572 index oil overnight, no further oil penetration was observed.
[g]Petrographic microscope examination (300×) showed the 1400° C-fired fibers to be microcrystalline, very homogeneous, and to have an index of refraction of about 1.64.
[h]A Laue pattern showed the presence of mullite as well as η $Al_2O_3$.
[i]1400° C-fired fibers were transparent with slight haziness.
[j]1000° C-fired fibers had density of 2.51 g/cc.
[k]Though "NIAPROOF" was used as a $B_2O_3$ precursor, the amount of $Al_2O_3$ it contributed to the $Al_2O_3$ content of the refractory fibers was added to that derived from the "NIACET".
[l]$P_2O_5$ precursor used in Example 13 was $H_3PO_4$.
[m]Composition also contained 1 wt % $Fe_2O_3$, derived from $FeCl_3 . 6H_2O$.
[n]Fibers were predominately mullite ($I_{rel}100$) but also contained small amount of η or γ $Al_2O_3$ ($I_{rel}2$ to 5).
[o]Fibers were predominately η γ $Al_2O_3$ ($I_{rel}100$) but also contained small amount of mullite ($I_{rel}300$).
[q]Fibers were predominately $\delta Al_2O_3$ ($I_{rel}100$) but also contained small amount of mullite ($I_{rel}20$ to 30).
[r]Fibers were predominately mullite ($I_{rel}100$) but also contained small amount of $\delta Al_2O_3$ ($I_{rel}20$).

Various modifications and alterations of this invention will become apparent to those skilled in the art without departing from the scope and spirit of this invention.

What is claimed is:

1. Transparent, smooth, fracture resistant, discrete, refractory oxide fibers uniformly round in cross section and of homogenous chemical composition comprising 96 to 100 weight percent of a mixture or chemical combination of 67 to 77 parts by weight alumina and 23 to 33 parts by weight silica, and fibers having a predominant polycrystalline phase of mullite, transitional alumina, or a mixture of both.

2. Fibers according to claim 1, wherein said polycrystalline phase is mullite.

3. Fibers according to claim 1, wherein said polycrystalline phase is mullite, the crystallites of which have an average size greater than 500 Angstroms, as determined by x-ray powder diffraction analysis.

4. Fibers according to claim 1, wherein said polycrystalline phase is transitional alumina and is in admixture with silica, said admixture being transformable at 1200 to 1400° C to a polycrystalline phase which is predominantly mullite.

5. Fibers according to claim 1, further comprising up to 4 total weight percent additive inorganic oxides selected from the group consisting of glass formers, intermediate glass formers, and non-glass formers, each said glass former being present in an amount up to 2 weight percent, each said intermediate glass former and non-glass former being present in an amount less than 1 weight percent or present in the amount of 1 to 2 weight percent provided an amount of 0.5 to 2 total weight percent of said glass formers is also present.

6. Fibers according to claim 1, further comprising up to 2 weight percent each of boria or phosphorus pentoxide, or both, the balance being a mixture or chemical combination of 70 to 75 parts by weight alumina and 25 to 30 parts by weight silica.

7. Fibers according to claim 1, further comprising from 0.5 up to 1 weight percent of boria of phosphorus pentoxide, or both, the balance being 99 to 99.5 weight percent of a mixture or chemical combination of 70 to 75 parts by weight alumina and 25 to 30 parts by weight silica.

8. Fibers according to claim 1, wherein said alumina and silica are present as $3Al_2O_3.2SiO_2$ in the amount of 99 weight percent, said fibers further comprising 0.5 weight percent $B_2O_3$, and 0.5 weight percent $P_2O_5$.

9. Fibers according to claim 1 having a friability index of at least 0.2.

10. Fibers according to claim 1 having a surface area of less than 1 $m^2/g$.

11. Fibers according to claim 1 which are continuous.

12. Yarn comprising fibers of claim 1 which are continuous.

13. Fibers according to claim 1 which are nonporous, free of shot, free of alpha alumina, and containing less than 0.1 weight percent carbon.

14. Fibers according to claim 1 with uniform diameters up to 25 micrometers.

15. Fibers according to claim 1 which are straight, and having uniform diameters of 7 to 15 micrometers.

16. Transparent, smooth, discrete, continuous, refractory, ceramic oxide fibers of homogeneous chemical composition comprising 99 to 99.5 weight percent of a mixture or chemical combination of 70 to 75 parts by weight alumina and 25 to 30 parts by weight silica, 0.5 to 1 weight percent of boria or phosphorus pentoxide, or both, and less than 0.1 weight percent carbon, said fibers being free of alpha alumina and having a polycrystalline phase of predominantly transitional alumina in admixture with silica which admixture is transformable upon firing said fibers at 1200° to 1400° C to mullite crystallites, said fibers having a friability index of at least 0.5 and a surface area less than 1 $m^2/g$, said fibers being straight and uniformly round with a uniform diameter of 7 to 15 micrometers.

17. Yarn comprising the fibers of claim 16.

18. Woven fabric comprising the fibers of claim 16.

19. A composite comprising a plastic, elastomeric, metallic, or ceramic matrix and fibers of claim 1.

20. A method for forming the refractory fibers of claim 1, which comprises fiberizing a viscous liquid of oxide precursors comprising a silica sol and a water dispersible alumina sol of water soluble or dispersible organic aluminum salt, said liquid having equivalent alumina and silica contents within or along the boundary lines A-B-C-D of FIG. 1 of the accompanying drawing, and drying, collecting, and calcining the resulting green fibers.

21. A method for forming the yarn of claim 17, which comprises continuously extruding through a plurality of stationary orifices a viscous aqueous dispersion comprising colloidal silica and a water soluble organic aluminum salt calcinable to alumina, said dispersion having equivalent alumina and silica contents within or along the boundary lines A-B-C-D of FIG. 1 of the accompanying drawing, continuously drawing in air the resulting continuous green fibers, continuously collecting said green fibers together as a strand, and continuously firing said strand in air in a relaxed, loose, unrestrained configuration to calcine it and convert it into said refractory yarn.

22. Transparent, smooth, fracture resistant, discrete, refractory oxide fibers uniformly round in cross-section and of homogeneous chemical composition comprising 96 to 100 weight percent of a mixture or chemical combination of 67 to 77 parts by weight alumina and 23 to 33 parts by weight silica, said fibers having a predominant polycrystalline phase of mullite, transitional alumina, or a mixture of both, a friability index of at least 0.2 and a surface area of less than 1 $m^2/g$.

23. Fibers according to claim 1 wherein said homogeneous chemical composition consists essentially of said mixture or chemical combination of alumina and silica.

* * * * *

UNITED STATES PATENT AND TRADEMARK OFFICE
CERTIFICATE OF CORRECTION

PATENT NO. : 4,047,965
DATED : September 13, 1977
INVENTOR(S) : Karl A. Karst and Harold G. Sowman It is certified that error appears in the above-identified patent and that said Letters Patent are hereby corrected as shown below:

Col. 1, l. 45  "envolved" should read -- evolved --.

Col. 2, l. 53  "Alos" should read -- Also --.

Col. 2, l. 25  "$3Al_2O_3 \cdot 2Si-$" should read

-- $3Al_2O_3 \cdot 2Si-$ --

Col. 4, l. 5  "$Al(NO_3)_3 \cdot 9H_2O$" should read

-- $Al(NO_3)_3 \cdot 9H_2O$ --.

Col. 4, l. 7  "$Al(OH)_2(OOCH_3) \cdot 1/3H_3BO_3$" should read -- $Al(OH)_2(OOCH_3) \cdot 1/3H_3BO_3$ --

Col. 19, l. 31  "$B_{2o3}$" should read -- $B_2O_3$ --.

Col. 20, l. 26  "locked" should read -- looked --.

Col. 20, l. 39  ">600" should read -- <600 --.

Col. 20, l. 52  "$Al_{2o3}$" should read -- $Al_2O_3$ --.

Col. 25, Table XI, second line of footnote f,  "borken" should read -- broken --.

UNITED STATES PATENT AND TRADEMARK OFFICE
CERTIFICATE OF CORRECTION

PATENT NO. : 4,047,965
DATED : September 13, 1977
INVENTOR(S) : Karl A. Karst and Harold G. Sowman It is certified that error appears in the above-identified patent and that said Letters Patent are hereby corrected as shown below:

Col. 25, Table XI, footnote o, "ηγ" should read -- η or γ --; and "$I_{rel}300$" should read -- $I_{rel}30$ --.

Col. 25, l. 61  "$FeCl_3.6H_2O$" should read -- $FeCl_3 \cdot 6H_2O$ --.

Col. 27, l. 24  "of" (second occurrence) should read -- or --.

Col. 26, l. 62  "and" should read -- said --.

Col. 27, l. 30  "$3Al_2O_3 \cdot \pounds SiO_2$" should read -- $3Al_2O_3 \cdot 2SiO_2$ --.

Signed and Sealed this

Twenty-fifth Day of July 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,047,965
DATED : September 13, 1977
INVENTOR(S) : Karl A. Karst and Harold G. Sowman It is certified that error appears in the above—identified patent and that said Letters Patent are hereby corrected as shown below:

Col. 2, l. 52          "$P_2O_3$" should read -- $P_2O_5$ --.

Signed and Sealed this

Fourth Day of March 1980

[SEAL]

Attest:

SIDNEY A. DIAMOND

*Attesting Officer*      *Commissioner of Patents and Trademarks*